United States Patent [19]

Baron

[11] Patent Number: 4,860,239
[45] Date of Patent: Aug. 22, 1989

[54] CORRELATOR WITH VARIABLY NORMALIZED INPUT SIGNALS

[75] Inventor: Kenneth C. Baron, New Hyde Park, N.Y.

[73] Assignee: Unisys Corporation, Blue Bell, Pa.

[21] Appl. No.: 84,521

[22] Filed: Aug. 12, 1987

[51] Int. Cl.[4] .............................................. G06F 15/31
[52] U.S. Cl. ........................ 364/728.03; 364/728.07; 367/100
[58] Field of Search ............... 364/819, 728, 748, 715, 364/728.03, 728.07; 382/42; 342/189; 375/96; 367/100

[56] References Cited

U.S. PATENT DOCUMENTS

| | | | |
|---|---|---|---|
| 3,831,012 | 8/1974 | Tate et al. ........................... | 364/728 |
| 3,903,405 | 9/1975 | Gaskill, Jr. ......................... | 364/728 |
| 4,244,026 | 1/1981 | Dickey, Jr. ...................... | 364/728 X |
| 4,270,179 | 5/1981 | Sifford et al. .................... | 364/728 X |
| 4,392,232 | 7/1983 | Andren et al. ................... | 364/728 X |
| 4,513,288 | 4/1985 | Weathers et al. ................ | 342/189 X |
| 4,587,620 | 5/1986 | Niimi et al. ................... | 364/728.07 X |
| 4,700,324 | 10/1987 | Doi et al. ....................... | 364/728 X |
| 4,766,563 | 8/1988 | Fujimoto ...................... | 364/728 X |

FOREIGN PATENT DOCUMENTS

| | | | |
|---|---|---|---|
| 0641463 | 1/1979 | U.S.S.R. .............................. | 364/728 |
| 0703836 | 12/1979 | U.S.S.R. ........................ | 364/728.03 |

Primary Examiner—Eugene R. LaRoche
Assistant Examiner—Seung Ham
Attorney, Agent, or Firm—Albert B. Cooper; Mark T. Starr; Robert S. Bramson

[57] ABSTRACT

A digital complex correlator for correlating in-phase and quadrature components of data samples by shearing the in-phase and quadrature data pairs by a predetermined multiple of the noise in the correlation window under analysis. The sheared data is multiplied by a variable factor generated in accordance with the shearing threshold and the number of samples in the window. The variable factor is generated to maximize the precision in the data while avoiding overflows in the complex multiplication and accumulation of the correlation process.

13 Claims, 2 Drawing Sheets $$I_1 I_2 - Q_1 Q_2 + j(I_1 Q_2 + I_2 Q_1)$$
$$\underbrace{\phantom{I_1 I_2 - Q_1 Q_2}}_{REAL} \quad \underbrace{\phantom{j(I_1 Q_2 + I_2 Q_1)}}_{IMAGINARY}$$

CORRELATOR WITH VARIABLY NORMALIZED INPUT SIGNALS

The invention herein described was made in the course of or under a contract or subcontract thereunder with the United States Government.

BACKGROUND OF THE INVENTION

1. Field of the Invention

The invention relates to digital and analog correlators particularly with respect to enhancing the accuracy thereof.

2. Description of the Prior Art

Digital as well as analog correlators are known in the art for correlating two signals and providing a correlation output therefor. Generally, in a digital correlator, digitally converted samples of the signals are applied to a digital multiplier and the product signals therefrom are applied to a digital accumulator for generating the correlation output. In an analog correlator, the analog signals are multiplied and the products are applied to an integrator for generating the correlation output.

In such prior art systems, the input data is multiplied by a constant value prior to performing the multiplication in order to preserve the precision therein. This procedure increases the numerical value of the input data thereby enhancing the precision. In the digital correlator, multiplication by the constant value shifts the information carrying bits to higher significant digit positions thus preserving the information from loss due to lower significant bit truncation in the multipliers. Typically a multiplication factor of 32 (a left shift of 5 bits) may be utilized. In the analog correlator, the multiplicaton factor is applied to raise the information content of the input signals above the inherent noise level of the components of the correlator.

Frequently, in the digital correlator, the multiplication by the constant factor creates sufficiently large amplitude data to cause an overflow in the multiplication or accumulation operations. If the overflow is not detected the correlation output is erroneous and cannot be utilized. Generally, it is undesirable to endeavor to detect the overflows in a digital correlator. Since, typically, the overflows occur in the accumulator carry stage, each time an accumulation is performed the carry bit must be checked. This results in a substantial loss in processing time which in many applications cannot be tolerated. Additionally, the equipment may not include a stage for receiving the overflow and hence detection thereof would not be possible. In the analog accumulator, multiplication by the constant factor may create sufficiently large amplitude data to cause nonlinear operation, such as amplifier saturation, in the components of the correlator. Such anomolous operation tends to render the correlation output useless.

SUMMARY OF THE INVENTION

In the present invention a variable multiplication factor is generated in accordance with conditions in the correlation window under analysis by the system in which the correlator is utilized. The variable multiplication factor replaces the constant multiplication factor of the prior art. In a digital correlator the variable multiplication factor is generated in accordance with the number of data samples in the correlation window over which the correlation is effected. In a system in which the signal levels are sheared to a multiplicative factor of the noise level, the variable multiplication factor is also generated in accordance with the noise level. The noise level and the number of input data samples over which the correlation is performed affect the correlation product and vary from window to window. In an analog correlator, the noise level is also utilized along with the correlation time of the window. The invention not only prohibits overflows from occuring, but in addition, ensures maximum precision in the correlation input data. Thus a maximally accurate correlation product is produced.

DESCRIPTION OF THE PREFERRED EMBODIMENT

Figure 1:
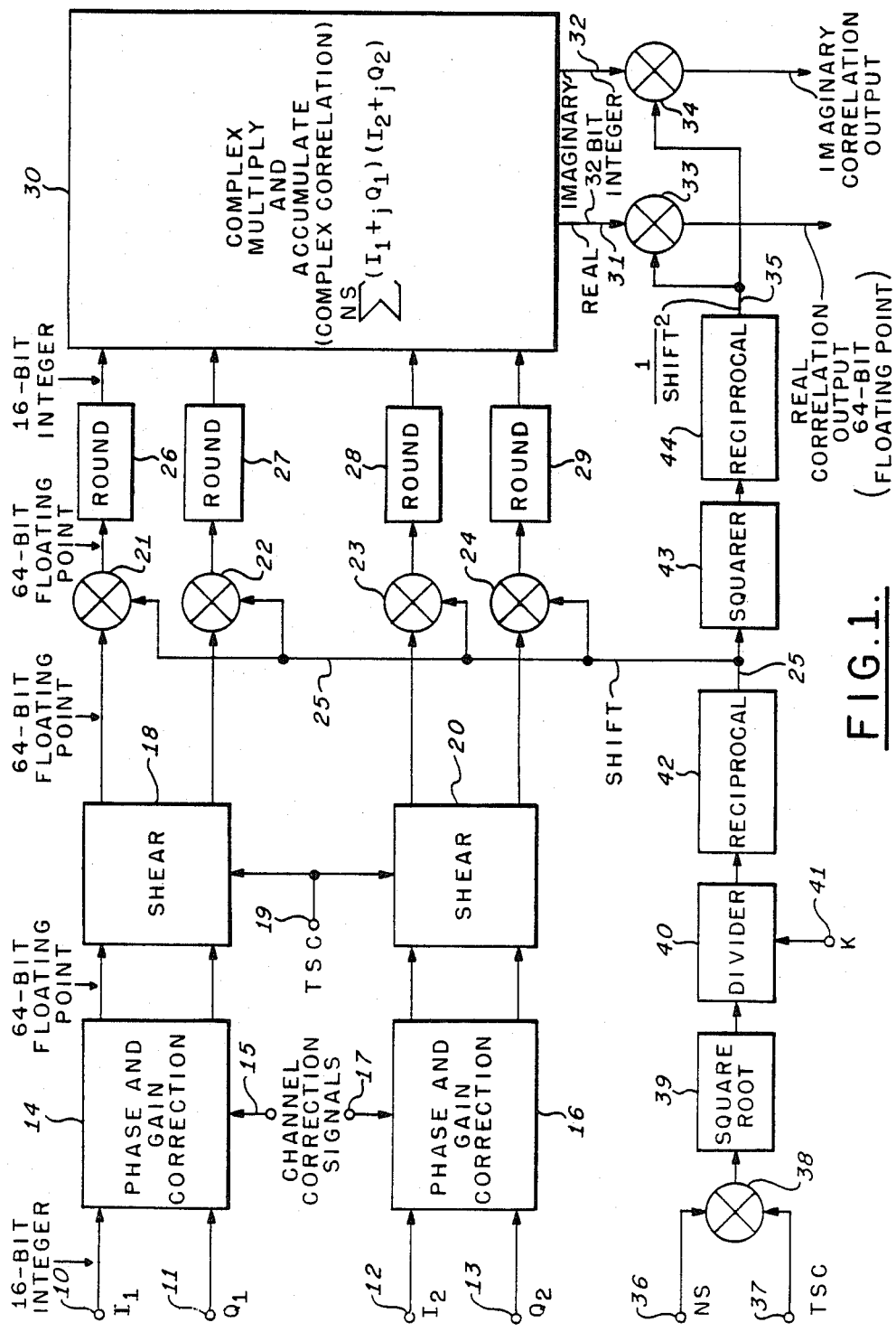
FIG. 1 is a schematic block diagram of a digital correlator utilizing the present invention.

Referring to FIG. 1, apparatus for performing complex correlation on In-phase and Quadrature (I&Q) data is illustrated. The correlator of FIG. 1 may, for example, be utilized in a sonar system for providing ship velocity data by correlating digitized ocean bottom returns. The sonar returns are correlated between two hydrophone channels by multiplying the I&Q data from one channel with the I&Q data from the other channel. The I&Q data may be derived, in a conventional manner, by sampling the analog-to-digital converted outputs from the hydrophone in each channel and utilizing digital filtering techniques to provide the In-phase and Quadrature components of the data. In a conventional manner, the system in which the correlator of FIG. 1 is utilized, sequentially opens a sonar correlation window during which the I&Q data is generated from the pulse returns from the hydrophones.

The digital In-phase samples ($I_1$) from a first channel are applied at a terminal 10 and the Quadrature components ($Q_1$) from the first channel are applied at a terminal 11. Similarly, the In-phase and Quadrature components ($I_2$ and $Q_2$) from the second channel are applied at terminals 12 and 13 respectively. In the preferred embodiment of the invention the I&Q data applied to the terminals 10–13 comprise 16-bit integer data signals.

The channels of the system have small phase and gain differences therebetween. Accordingly the I&Q data applied to the terminals 10–13 are phase and gain corrected to equalize these interchannel anomolies. The I&Q data applied to the terminals 10 and 11 are phase and gain corrected by a correction function 14 in accordance with channel correction signals applied to a terminal 15. The channel correction signals applied to the terminal 15 are derived in the system in a conventional manner well appreciated in the art. The correction function 14 includes an interger-to-floating point conversion that converts the phase and gain corrected 16-bit integer I&Q data to 64-bit floating point format. In a similar manner the I&Q data applied at the terminals 12 and 13 are phase and gain corrected by a correction function 16 pursuant to channel correction signals applied at a terminal 17. The phase and gain correction function 16 also includes an integer-to-floating point conversion for converting the 16-bit integer I&Q data $I_2$ and $Q_2$ to 64-bit floating point format.

In order to enhance the operation of the correlator of FIG. 1, the I&Q data signals are sheared to a predetermined multiple of the average noise level existing in the sonar window under analysis. In the preferred embodiment of the invention, the I&Q data signals are sheared to four times the noise level. Accordingly, the phase and gain corrected I&Q data signals received at the terminals 10 and 11 are applied to a shearing function 18. The shearing function 18 accepts the I&Q data signals in 64-bit floating point format and provides the sheared I&Q data signals in 64-bit floating point format. The shearing function 18 is responsive to a shearing threshold signal TSC applied at a terminal 19 in a manner to be later described with respect to FIG. 2. The shearing function 18 scales each I&Q pair having power less than or equal to TSC by a factor of unity. When the power of the I&Q pair is greater than TSC, the shearing function 18 scales the I&Q signals by a factor that rendors the power of the sample equal to TSC. Thus the shearing function 18 decreases the amplitudes of the I&Q data signals that are greater than TSC to equal TSC while preserving the phase relationships between I&Q. Thus the amplitudes of the signals detected in the window under analysis is limited to four times the noise power while preserving the I&Q phase relationships. In a manner similar to that described with respect to the shearing function 18, a shearing function 20 shears the 64-bit floating point phase and gain corrected I&Q signals from the correction function 16 in accordance with the TSC signal at the terminal 19. The shearing function 20, accordingly, provides 64-bit floating point I&Q data sheared to four times the noise power.

The TSC signal is generated in the system in which the correlator of FIG. 1 is utilized as follows. A pulse detector (not shown) locates the first return pulse in the sonar window under analysis. For each I&Q data pair occurring prior to the first pulse, the I component and Q component thereof are squared and the squared signals added to provide the power of the pair. The power of all of the I&Q samples occurring prior to the first pulse from all of the channels of the system are averaged and the average noise power is multiplied by four to obtain TSC for the window.

Thus it is appreciated that after the phase and gain corrections are applied by the correction functions 14 and 16, the signal power is sheared to four times the noise power by the shearing functions 18 and 20. Accordingly, $$MAX(I_S^2+Q_S^2)=4\times AVRG(I_N^2+Q_N^2)=4\times APN=TSC$$

where:
$I_S$ and $Q_S$ are the I&Q components of the signal
$I_N$ and $Q_N$ are the I&Q components of the noise
APN=average noise power The sheared In-phase data component $I_1$ is applied as an input to a multiplier 21. The sheared Quadrature data component $Q_1$ is applied as an input to a multiplier 22. The sheared In-phase data component $I_2$ is applied as an input to a multiplier 23 and the sheared Quadrature data component $Q_2$ is applied as an input to a multiplier 24. A variable normalizing factor SHIFT is applied as a second input to the multipliers 21–24 via a path 25. The I&Q signals are multiplied by the factor SHIFT to maximize precision and prevent overflow in a manner to be described. The factor SHIFT is in floating point format and thus the outputs of the multipliers 21–24 constitute 64-bit floating point normalized I&Q signals.

The floating point output from the multiplier 21 is applied to a rounding function 26 that rounds off the normalized $I_1$ data to a 16-bit integer format. The rounding function 26 may either increase or decrease the normalized $I_1$ data value depending on whether the truncated bits are less then, equal to, or greater than $\frac{1}{2}$. In a similar manner the normalized $Q_1$, $I_2$, and $Q_2$ signals from the multipliers 22–24 are rounded to 16-bit integer format in rounding functions 27–29 respectively.

The 16-bit integer I&Q data $I_1$, $Q_1$, $I_2$ and $Q_2$ from the rounding functions 26–29, respectively are applied to a complex mulitply and accumulate function 30. The function 30 performs complex correlation in accordance with the illustrated expression to provide a correlation product comprising a real portion on a path 31 and an imaginary portion on a path 32. In a manner to be later described in greater detail with respect to FIG. 3, the function 30 multiplies the 16-bit I&Q signals in 32-bit multipliers and accumulates the real and imaginary portions in 32-bit accumulators. Thus, the real and imaginary portions on the paths 31 and 32 respectively are in 32-bit integer format. The expression within the function block 30 indicates that the complex data pairs from the two channels are multiplied together and the products accumulated over NS data samples. NS is a signal generated in the system in which the correlator of FIG. 1 is utilized representative of the number of data samples taken in the correlation window under analysis. In the preferred embodiment of the invention NS is limited to 140, and may be as low as 15.

The real portion of the correlation product on the path 31 is applied as an input to a multiplier 33 and the imaginary portion on the path 32 is applied as an input to a multiplier 34. The multipliers 33 and 34 include means for converting the integer format of the real and imaginary portions to floating point format and multiplying these quantities by the factor $1/(SHIFT)^2$ applied on a path 35 as a second input to the multipliers 33 and 34. The outputs of the multipliers 33 and 34 provide the real and imaginary correlation outputs, respectively, in 64-bit floating point format. Thus, in a correlation window, two I&Q pairs for each of NS samples is applied at the terminals 10–13 to generate one correlation product comprising two floating point signals representing the real and imaginary portions of the correlation product, respectively.

If the multiplicaton factor on the path 25 is too large, undesirable overflows may occur in the multipliers in the function block 30 but more likely will occur in the accumulators therein when the complex multiply and accumulate function 30 is summing over NS samples. Additionaly, these undesirable overflows may be caused by the rounding functions 26–29 when the floating point I&Q signals are rounded up to integer format. The factor SHIFT on the path 25 is generated, in a manner to be explained, to maximize the precision of the I&Q data and prevent overflows when summing over NS samples. The factor SHIFT is also generated to prevent overflows from occurring under worst case rounding effects.

The correlator of FIG. 1 includes logic for generating the factor SHIFT on the path 25 to maximize precision in the I&Q data components while preventing overflow in the complex multiply and accumulate function 30 when summing over NS I&Q pair samples. Accordingly, the signal NS is applied at a terminal 36 and the signal TSC is applied at a terminal 37. The NS and TSC signals are applied as respective inputs to a multiplier 38 to provide the product thereof. The output of the multiplier 38 is applied to a square root function 39 for taking the square root thereof. The output of the square root function 39 is applied as an input to a divider 40 that divides the square root output from the square root function 39 by a constant K applied at a terminal 41. The constant K is chosen to prevent overflow, in a manner to be described, in accordance with the width of the multipliers and accumulators in the function 30 and in accordance with the rounding effects of the rounding functions 26–29. In the preferred embodiment described herein, K is set at 46,000.

The output of the divider 40 is applied to a reciprocal function 42 that provides the reciprocal thereof, thereby providing the factor SHIFT on the path 25. Accordingly it is appreciated that:

$$SHIFT = K/(NS \times TSC)^{\frac{1}{2}}$$

The factor shift on the path 25 is applied through a squaring function 43 and a reciprocal function 44 to provide the signal $1/(SHIFT)^2$ on the path 35. Since the I&Q signals applied to the multipliers 21–24 are multiplied by SHIFT, and these normalized signals are multiplied together in the complex multiply and accumulate function 30, the real and imaginary correlation product component signals must be divided by $(SHIFT)^2$ to recover the real and imaginary correlation outputs.

The factor SHIFT that will maximize precision and prevent overflow when summing over NS samples is derived by requiring that:

$$NS \times SHIFT^2 \times TSC < 2^{31} \quad (1)$$

The quantity $2^{31}$ is utilized because the multipliers and accumulators in the complex multiply and accumulate function 30 are 32-bits wide. Thus:

$$SHIFT < 46,340.95/(NS \times TSC)^{\frac{1}{2}}$$

This is a worst case condition assuming that each I&Q data pair is sheared to the maximum value TSC.

As previously described, the constant K applied at the terminal 41 is selected to prevent overflows resulting, inter alia, from the increase in data values caused by the rounding functions 26–29. Accordingly, after SHIFT has been applied to each I&Q pair, the power thereof will be:

$$I^2 + Q^2 \approx 2^{31}/NS$$

This assumes the worst case situation where each I&Q pair is sheared to its maximum value TSC. The outputs of the multipliers 21–24, which are in floating point format, are rounded off to 16-bit integers in the rounding functions 26–29, respectively. It is believed that the worst case rounding effects will occur when the magnitude of the In-phase and Quadrature components is equally shared between I&Q. Accordingly:

$$2I^2 \approx 2^{31}/NS$$

$$I \approx 32768/(NS)^{\frac{1}{2}} \approx Q$$

For example, when an I or Q quantity having a magnitude such as 18.6 is rounded off to 19, resulting in large I&Q values, overflow may result. The largest increase in a summation term (i.e. a power term) due to this rounding procedure is approximately:

$$[32768/(NS)^{\frac{1}{2}}] \times 2$$

The factor "2" is utilized because each power term includes I and Q.

This quantity results from the phenomenom that when a term is rounded up and squared the maximum increase in the squared term due to the rounding is approximately equal to the term itself. This may be appreciated from the following:

$$(XXX.0+1)^2 - (XXX.0+0.5)^2 = XXX.0 + 0.75 \approx XXX.0$$

where the term $(XXX.0+1)$ is rounded up and the term $(XXX.0+0.5)$ is the true value.

Thus, with rounding taken into account, relationship (1) becomes:

$$NS \times SHIFT^2 \times TSC < \{2^{31} - [NS \times 32768/(NS)^{\frac{1}{2}}] \times 2\}$$

The NS term in the numerator is provided for the NS power terms to be summed over the correlation window. The subtrahend is largest when NS = 140 thus:

$$SHIFT < 46,332.6/(NS \times TSC)^{\frac{1}{2}}$$

For safety, the constant K applied to the terminal 41 is set at 46,000.

Figure 2:
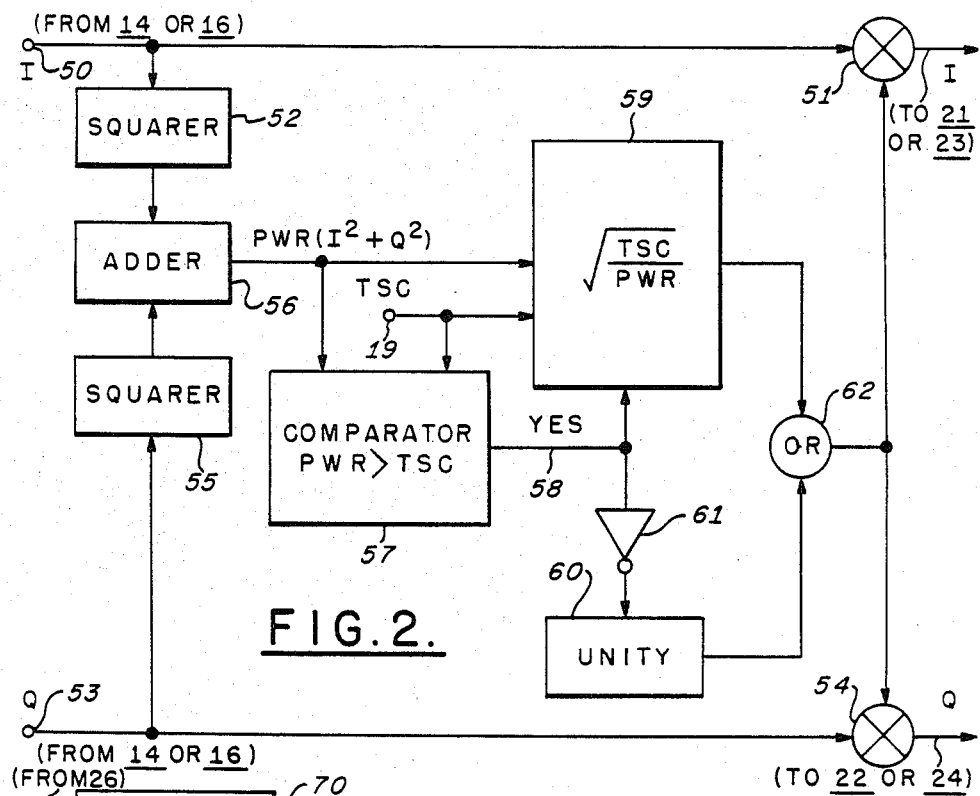
FIG. 2 is a schematic block diagram of the shearing apparatus of FIG. 1.

Referring to FIG. 2, details of the shearing function 18 are illustrated. It is appreciated that the shearing function 20 is identical to the shearing function 18. The In-phase component, I, of an I&Q pair is applied at a terminal 50 as inputs to a multiplier 51 and a squaring function 52. The Quadrature component, Q, of the I&Q pair is applied to a terminal 53 as inputs to a multiplier 54 and a squaring function 55. The outputs of the squaring functions 52 and 55 are applied as inputs to an adder 56 which provides the sum of the squares of the I component and Q component. Thus, the output of the adder 56 provides a signal representative of the power (PWR) of the I&Q pair applied to the terminals 50 and 53. The TSC signal applied at the terminal 19 is provided as an input to a comparator 57. The comparator 57 also receives as an input the signal PWR from the adder 56. The comparator 57 compares PWR to TSC and provides a signal on a line 58 when PWR is greater than TSC. The PWR signal from the adder 56 and the TSC signal from the terminal 19 are also applied to a scale generation function 59 that provides a scaling factor equal to $(TSC/PWR)^{\frac{1}{2}}$. The shearing function of FIG. 2 also includes a unity scale generation function 60 that provides a scaling factor of unity.

The output of the comparator 57 on the line 58 is applied directly to the scale generation function 59 as an enabling input thereto. The output of the comparator 57 on the line 58 is also applied as an enabling input to the unity scale generation function 60 through an inverter 61. Thus, when PWR > TSC the scale generation function 59 is enabled and the unity scale generation function 60 is disabled. When, however, PWR is less than or equal to TSC the unity scale generation function 60 is enabled and the scale generation function 59 is disabled. The outputs of the scale generation functions 59 and 60 are applied as inputs to an OR gate 62 and the output of the OR gate 62 is provided as inputs to the multipliers 51 and 54.

It is appreciated therefore that when PWR>TSC the I&Q components of the I&Q pair applied at the terminals 50 and 53 are each scaled by $(TSC/PWR)^{\frac{1}{2}}$; otherwise the I&Q components are transmitted through the multipliers 51 and 54, respectively, unchanged. Thus any I&Q pair with power less than or equal to TSC is transmitted through the shearing function unaltered. If however, the power of the I&Q pair is greater than TSC the power of the pair is scaled to be equal to TSC and the phase relationships are preserved.

Figure 3:
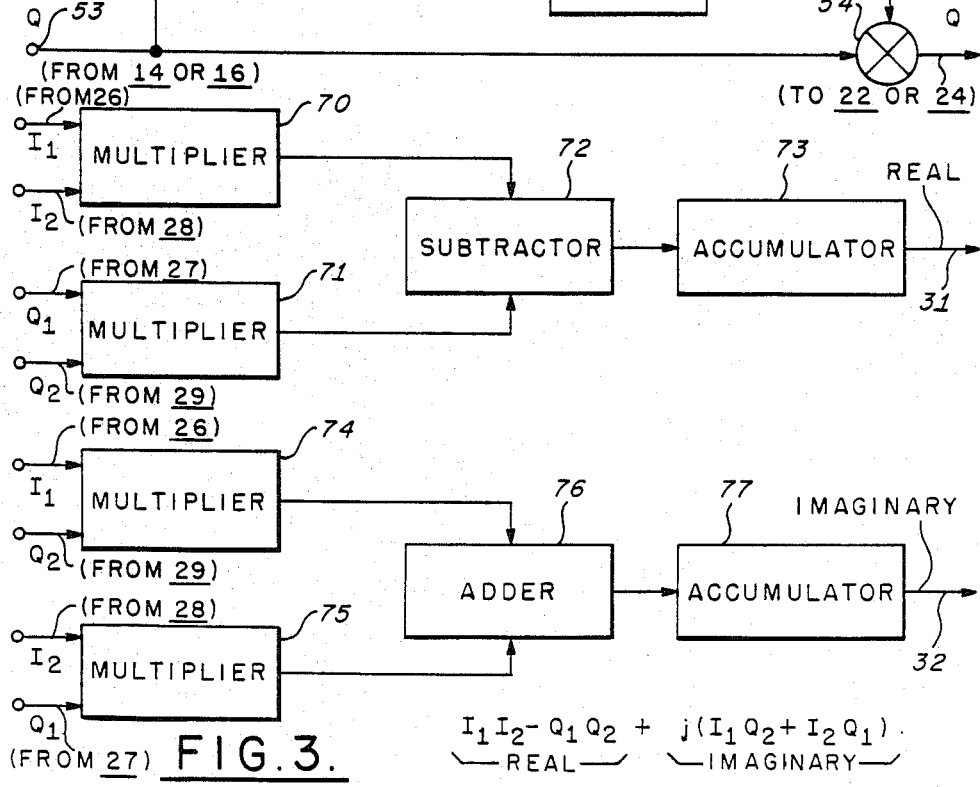
FIG. 3 is a schematic block diagram of the complex multiply and accumulate apparatus of FIG. 1.

Referring to FIG. 3, details of the complex multiply and accumulate function 30 are illustrated. The sheared, normalized, and rounded In-phase components $I_1$ and $I_2$ are applied as inputs to a multiplier 70. The sheared, normalized, and rounded Qudrature components $Q_1$ and $Q_2$ are applied as inputs to a multiplier 71. The outputs of the multipliers 70 and 71 are applied as inputs to a subtractor 72. The output of the subtractor 72 provides the real component $(I_1I_2 - Q_1Q_2)$ of the complex multiplication performed by the complex multiply and accumulate function 30. The output of the subtractor 72 is applied to an accumulator 73 for accumulating the real components provided by the subtractor 72 over the NS samples in the correlation window under analysis. The accumulator 73 therefore provides, on the path 31, the real portion of the correlation product provided by the complex correlation process performed by the function 30. It is appreciated that the multipliers 70 and 71, the subtractor 72, and the accumulator 73 are each 32-bits wide in the preferred embodiment of the invention.

The sheared, normalized, and rounded In-phase and Quadrature components $I_1$ and $Q_2$ are applied as inputs to a multiplier 74. The sheared, normalized, and rounded In-phase and Quadrature components $I_2$ and $Q_1$ are applied as inputs to a multiplier 75. The outputs of the multipliers 74 and 75 are applied as inputs to an adder 76. The output of the adder 76 provides the imaginary component of the complex multiplication of the I&Q pairs $(I_1Q_2 + I_2Q_1)$. The output of the adder 76 is applied to an accumulator 77 for accumulating the imaginary components of the complex multiplication over the NS samples in the correlation window under analysis. The accumulator 77 therefore provides the imaginary portion of the correlation product on the path 32. The multipliers 74 and 75, the adder 76 and the accumulator 77 are 32-bits wide in the preferred embodiment of the invention.

It is appreciated that the variable factor SHIFT is generated in accordance with the conditions encountered in the correlation window under analysis. The conditions which vary from window to window and which affect the correlation product are the noise level and the number of I&Q samples over which the correlation is performed as described above. Multiplication of the I&Q components by SHIFT prohibits an overflow from occurring in the multipliers and accumulators of FIG. 3, and in addition ensure maximum precision in the I&Q data signals. Thus a maximally accurate correlation product is provided by the correlator of FIG. 1.

If shearing were not utilized, the factor SHIFT would be based on the number of samples in the window and on statistical assumptions predicted on empirical data collection. Alternatively, the SHIFT factor or, in an analog embodiment, an amplifying factor may be based solely on the number of samples accumulated.

The illustrated embodiment of the present invention may be implemented by discrete digital components or by suitable software routinely coded from readily derivable flow charts.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Digital correlator apparatus adapted to receive, in a correlation window, digital input signal samples to be correlated and to provide a correlation output signal in accordance therewith, said apparatus including digital multiplier means responsive to said digital input signal samples for providing products therebetween and digital accumulator means coupled to said digital multiplier means for accumulating said products to provide said correlation output signal, comprising factor multiplying means responsive to said digital input signal samples and to a variable factor signal for multiplying said digital input signal samples by said variable factor signal to provide enhanced precision digital input signal samples so as to enhance the accuracy of said correlation output signal, and factor generating means responsive to conditions associated with said correlation window for generating said variable factor signal in accordance with said conditions so that when said digital input signal samples are multiplied by said variable factor signal, said enhanced precision digital input signal samples are as large as possible without causing overflow signals to occur in said digital multiplier means or in said digital accumulator means.

2. The apparatus of claim 1 wherein said factor generating means comprises means for generating said variable factor signal in accordance with the number of said digital input signal samples in said correlation window.

3. The apparatus of claim 1 wherein said correlation window has noise signal associated therewith, said apparatus further including shearing means for limiting the amplitudes of said digital input signal samples to a predetermined multiple of said noise signals in said correlation window.

4. The apparatus of claim 3 wherein said factor generating means comprises means for generating said variable factor signal in accordance with said noise signals in said correlation window and the number of said digital input signal samples in said correlation window.

5. The apparatus of claim 4 wherein said factor generating means comprises means for generating said variable factor signal in accordance with said predetermined multiple of said noise signals.

6. The apparatus of claim 1 in which said factor generating means comprises means for generating said variable factor signal in accordance with the number of stages in said digital accumulator means.

7. The apparatus of claim 1 wherein said factor generating means comprises means for generating said variable factor signal in accordance with noise signals in said correlation window.

8. A method for digitally correlating digital input signal samples received in a correlation window to provide a correlation output signal in accordance therewith, said method including digitally multiplying said digital input signal samples for providing products therebetween and digitally accumulating said products to provide said correlation output signal, comprising
multiplying said digital input signal samples by a variable factor signal to provide enhanced precision digital input signal samples so as to enhance the accuracy of said correlation output signal, and
generating said variable factor signal in accordance with conditions associated with said correlation window so that when said digital input signal samples are multiplied by said variable factor signal, said enhanced precision digital input signal samples are as large as possible without causing overflow signals to occur in said digital multiplying step or in said digital accumulating step.

9. The method of claim 8 wherein said generating step comprises generating said variable factor signal in accordance with the number of said digital input signal samples in said correlation window.

10. The method of claim 8 further including shearing said digital input signal samples by limiting the amplitudes thereof to a predetermined multiple of noise signals in said correlation window.

11. The method of claim 10 wherein said generating step comprises generating said variable factor signal in accordance with said noise signals in said correlation window and the number of said digital input signal samples in said correlation window.

12. The method of claim 11 wherein said generating step comprises generating said variable factor signal in accordance with said predetermined multiple of said noise signals.

13. The method of claim 8 wherein said generating step comprises generating said variable factor signal in accordance with noise signals in said correlation window.

* * * * *